(12) United States Patent
Perkins

(10) Patent No.: US 7,171,955 B2
(45) Date of Patent: Feb. 6, 2007

(54) FLOWING FLUID CONDITIONER

(76) Inventor: Michael T. Perkins, 902 McPhaul St., Austin, TX (US) 78758

( * ) Notice: Subject to any disclaimer, the term of this patent is extended or adjusted under 35 U.S.C. 154(b) by 0 days.

(21) Appl. No.: 10/930,998

(22) Filed: Aug. 31, 2004

(65) Prior Publication Data

US 2005/0081834 A1   Apr. 21, 2005

Related U.S. Application Data

(60) Provisional application No. 60/512,470, filed on Oct. 20, 2003.

(51) Int. Cl.
 *F02B 33/00* (2006.01)
 *F02B 29/04* (2006.01)
 *F01P 7/14* (2006.01)

(52) U.S. Cl. .................... 123/563; 123/41.1; 60/599

(58) Field of Classification Search ........ 123/555–556, 123/563, 549, 543, 41.1; 60/599; 62/3.2, 62/3.3, 3.7
See application file for complete search history.

(56) References Cited

U.S. PATENT DOCUMENTS

| 4,480,439 | A | * | 11/1984 | Yamane ........................ 123/563 |
| 4,864,084 | A | | 9/1989 | Cardinale ...................... 200/5 |
| 5,435,289 | A | | 7/1995 | Pendlebury et al. ........... 123/563 |
| 5,547,019 | A | | 8/1996 | Iacuilo .......................... 165/51 |
| 5,555,854 | A | * | 9/1996 | Huemer et al. ............ 123/41.1 |
| 5,669,363 | A | | 9/1997 | Francis ........................ 123/563 |
| 5,737,923 | A | * | 4/1998 | Gilley et al. .................. 62/3.7 |
| 5,802,856 | A | * | 9/1998 | Schaper et al. ............... 62/3.7 |
| 5,871,001 | A | | 2/1999 | Pelkey ........................ 123/542 |
| 6,247,460 | B1 | | 6/2001 | Lindberg ..................... 123/563 |
| 6,311,676 | B1 | | 11/2001 | Oberg ......................... 123/563 |
| 6,314,949 | B1 | | 11/2001 | DeGrazia .................... 123/542 |
| 6,394,076 | B1 | | 5/2002 | Hudelson .................... 123/540 |
| 6,509,520 | B1 | * | 1/2003 | Kyle et al. ................... 136/201 |
| 6,622,710 | B2 | | 9/2003 | Hasegawa ................... 123/563 |
| 6,748,934 | B2 | | 6/2004 | Nagkin ....................... 123/563 |
| 6,758,193 | B1 | | 7/2004 | Kincaid ....................... 123/542 |
| 6,880,346 | B1 | * | 4/2005 | Tseng et al. .................. 62/3.7 |
| 2002/0038550 | A1 | * | 4/2002 | Gillen .......................... 62/3.7 |
| 2002/0162339 | A1 | * | 11/2002 | Harrison et al. ............. 62/3.7 |
| 2004/0025516 | A1 | * | 2/2004 | Van Winkle .................. 62/3.3 |
| 2004/0104022 | A1 | * | 6/2004 | Kenny et al. ................ 165/299 |

FOREIGN PATENT DOCUMENTS

| GB | 2231142 A | 11/1990 | ............ 165/54 |
| JP | 403134229 A | 6/1991 | ............ 123/536 |

* cited by examiner

*Primary Examiner*—Thai-Ba Trieu

(57) ABSTRACT

A method and system for temperature conditioning of engine intake air by use of controllable intercooler which consists of an active thermoelectric device and a controllable valve system which optimally directs the path of airflow through a plurality of chambers in response to signals from a controller in order to optimally provide temperature conditioned air to the engine. System features temperature storage isolated from heat soaked engine components allowing immediate and efficient conditioning of airflow into an internal combustion engine. Intelligent control of this device removes parasitic power drains during high demand situations.

19 Claims, 13 Drawing Sheets

FLOWING FLUID CONDITIONER

CROSS-REFERENCE TO RELATED APPLICATION

This Application claims the benefit of Provisional Patent Application Ser. No. 60/512,470 filed Oct. 20, 2003

FEDERALLY SPONSORED RESEARCH

Not Applicable

SEQUENCE LISTING OR PROGRAM

Not Applicable

BACKGROUND—FIELD OF THE INVENTION

This invention relates to systems for temperature conditioning of flowing fluids by using active conditioning devices. Specifically for cooling or heating of flowing fluids in applications that require efficiency in size, reliability, weight, flexibility and on-demand capability.

BACKGROUND—DESCRIPTION OF PRIOR ART

Existing devices for conditioning of fluids have relied on refrigeration with compressors, air-to-air intercoolers, liquid-to-air, fluid misting of intercoolers, fluid injection or ice bath chillers. These systems suffer from bulkiness, need to be recharged (as misters and fluid injectors) and fragile support equipment as with compressors, and are therefore unsuitable for mobile devices such as vehicles. Similar problems occur with large volume exchangers having correspondingly large pressure drops and small temperature gains as in air-to-air intercoolers. Likewise, requirements for reservoirs and ice baths as with ice chillers make their use in vehicles inconvenient were vehicles are intended to be mobile. Liquid misters and injectors require frequent replenishment and sophisticated controls and nozzles, and reliability problems are often experienced. A mister cooled turbo system set up for maximum output would cause a host engine to self-destruct if fluid was low or delivery portion became "clogged" in the mister system.

Temperature directly affects the performance of an internal combustion engine when under heavy loads. So that the ability to cool the air input into an engine when under heavy loads will directly increase efficiency and horsepower. Air charge temperature also affects wear and reliability of engine components when under heavy loads. Therefore, a lower temperature input when under heavy loads will lengthen engine life, reduce emissions and improve overall performance.

A number of attempts have been made to accomplish cooling of the air just prior to engine intake. Specifically, active elements have in the past been applied to intercoolers. However, said designs such as Iaculio's U.S. Pat. No. 5,547,019, August 1996 would not facilitate the desired results. The preferred embodiments described by Iacullo require too much cooling from the thermoelectric devices, resulting in the need for immediate response by the active devices. This is not possible without massive peltier junctions and thousands of amps current applied to the intercooler. Producing the amount of heat removal required to chill the charged air to the necessary temperature, would consume excessive power and result in a continuous parasitic drain on the battery. The subsequent drag on engine power would yield a considerable net loss of performance. Iaculio's system will also have too slow a response time to be effective with the type of loads, and under such conditions, that can be characterized as "on demand operation". The intercooler in Iacuilo's system does not give enough detail to demonstrate that it will have sufficient capacity to cool charged air. An intercooler located directly in the air path for normal operation will not be capable of "storing" cold reserves for specific uses. No parallel, by-pass or alternative air passage is envisioned to allow normal operation of the system that will not deplete a reserve in an exchanger. Chilling incoming air during conditions other than wide-open-throttle (WOT) or heavy load, does not improve engine efficiency and will result in a net power loss when compared to an engine system without chilling. Iacuilo's system offers no substance to counteract the above deficits and as disclosed does not appear to be of sufficient capacity to cool the charged air. Iacuilo also does not provide for practical control for embodiment operation. For example, no WOT signal is discussed or provided herein. And without strategic, adequate controls, requiring operation of the Peltier Junctions in a steady-state condition during vehicle driving is not practical. Furthermore, the heat sinks surfaces proposed by Iacuilo do not appear sufficient to afford adequate heat dissipation. Also, no isolation for heat or moisture is provided around the heat pump hot or cold plates thereby reducing efficiency, capacity, and heat pump life.

Kincaid, U.S. Pat. No. 6,758,193, July 2004 discloses a super-chilled air induction apparatus that also includes a thermoelectric cooling device. As Kincaid discloses his system several shortcoming become oblivious. His design requires operator interaction and supervisory input while driving. This may be allowable for certain aftermarket applications, however, a lack of sensors and actuators for an automated controller that monitors engine as well as add-on chiller will restrict benefits and applications of said systems. Additionally, an automated controller could supervise temperature supplementation without driver distraction and potential safety liabilities. Lacking in Kincaid's disclosure is a smart controller (with a capable power switching controller) that could additionally, assist in cold start operation resulting in improved performance and reduce emissions; no provisions are proposed for these capabilities by Kincaid. Heat sinks as envisioned by Kincaid have no forced air features and will function only marginally when vehicle is at a stop or in traffic. Without adequate controller features and sensors such as with Kincaid WOT condition is not sensed. Without a WOT signal available to a robust controller said system will continue to draw large amounts of current during high demand operation (when system is intend to supplement performance) compromising performance. All modem engine management systems disable large power drawing devices during hard acceleration (i.e. air conditioning). This is necessary to remove all non-critical parasitics for short power bursts.

Current designs, such as Pendelbury, U.S. Pat. No. 5,435,289 July, 1995 and Natkin, U.S. Pat. No. 6,748,934, June, 2004 make use of air-conditioning systems for cooling of the water in air-to-water intercoolers. For the latter, as evidenced by the referenced testing results, the design can be implemented with desired results. However, extensive modifications of vehicle ducting, controls, vents, plumbing and engine compartment are required. These requirements make such systems more expensive, more time consuming to install, and more complicated to retrofit for existing vehicles. Recently, these factors have become even more important. For light vehicles, there is a premium value of space under hood. Cars designed for racing competition seldom include vehicle air conditioning systems. This makes air conditioner based intercoolers impractical for these applications.

The air-to-water intercooler in Pelkey, U.S. Pat. No. 5,871,001 February 1999 is designed to remain directly in the airflow path thereby eliminating the system's ability to rapidly overcome latent heat build up. That patented design offers an alternative embodiment that essentially substitutes an air conditioning dryer which functions as a heat-dissipating radiator. While such an approach could be physically implemented, the resulting embodiment, as described by Pelkey, would suffer from the above-mentioned shortcomings, and also have an overall loss of power in real applications. That is, there is no advantage to conditioning during normal driving because such cooling needs would be prohibitively power demanding. Also, cooling response time (without a reservoir of stored BTUs) is essentially non-responsive. Therefore an inline cooling solution is compromised both in the ability to perform under demand conditions as required in normal driving conditions for passing, and for competition in drag racing type events. The inline invention therefore will achieve no net benefits in the real world applications.

Oberg U.S. Pat. No. 6,311,676, November 2001 discloses an intercooler arrangement for a motor vehicle. Oberg addresses shapes and types of intercoolers. Without active methods and requisite controllers little is to be gained by Oberg's system. DeGrazia Jr. U.S. Pat. No. 6,314,949, November 2002 discloses a vehicle induction system. DeGrazia describes a system that uses air from the interior of a vehicle and incorporating parts of vehicles HVAC system in conjunction with magnets. While certain advantages may seem available with these configurations connecting the input of an internal combustion engine compromises the occupants air and sound quality especially if a "back fire" should occur, risking fire and contamination. Hudelson, U.S. Pat. No. 6,394,076, May, 2002 discloses an engine charge air cooler. Hudelson relies on the vehicles air conditioning system to provide reduced temperatures for an intercooler. While this may have some advantages the complexity and additional plumbing under the hood will produce little gain.

Hasegawa, U.S. Pat. No. 6,622,710, September 2003 discloses a temperature inlet controlling system for a self-ignition combustion engine. Hasegawa addresses the critical requirements of self-ignition with a by-pass intercooler arrangement. Without active elements and robust controllers added to this system full temperature operation will not be possible. This includes very cold weather where warming is necessary and very hot situations where sub ambient conditioning of inlet air is required. Lindberg, U.S. Pat. No. 6,247,460, June, 2001 discloses a vortex tube affixed to a turbocharger, supercharger or intake manifold of an engine. Applications of what is often referred to as the "Hilsch" vortex tube are used in a variety of systems. While hot and cold fluids can be separated by use of such tubes with compressed air (and to some extent vacuum as described by Lindberg) the overall efficiency of this type of system will be low. The resulting performance of such a system will experience sufficient losses to mitigate any real power gains. The trend toward smaller automobile engines is driven by a need to meet targets for lower carbon dioxide emissions. In order to achieve this goal, the auto industry is introducing smaller engines that are more fuel-efficient, but customers have come to expect a high level of performance. Therefore, the solution is to use assisted aspiration technologies. That is, a small engine with boosting that can match the peak power of a larger naturally aspirated unit while still having the benefit of using less fuel and exhausting lower $CO_2$ emissions. The intercooler is a natural complement to forced air aspiration systems that naturally tend to heat the air as they compress. Despite technological advances with intercoolers, several critical weaknesses remain in all prior systems. Prior art does not provide for large temperature gains in the charged air being by virtue of being air-to-air based intercoolers. Of the active systems, prior art runs the thermoelectric to drain engine power and does not have a control mechanism to achieve efficiency of operation. Also equipment for heat sink of prior art designs do not provide for stationary operation or moisture build up around the cold plates. Prior art which makes use of air-to-water or which make dual use of the air conditioning system suffer from difficulty of installation and their monopolization of precious under hood real estate. All of the above are incorporated by reference as fully set forth herein, describe devices for augmenting intake air.

SUMMARY AND OBJECTS OF THE INVENTION

Objects and Advantages of the Invention

In view of the above state of the art, the Flowing Fluid Conditioner (FFC) seeks the primary goal of providing a system that can assist in the implementation of smaller engines with reduced fuel consumption, lowered emissions but maintaining performance of larger engines these more efficient versions will replace. The following objects and advantages realize this goal:

a. It is a primary object of FFC is to improve engine performance by reducing air intake temperature for internal combustion engines (self-igniting or sparked; boosted or normally aspirated).

b. It is another object of FFC to reduce emissions by reducing air intake temperature for internal combustion engines (self-igniting or sparked; boosted or normally aspirated).

c. It is another object of FFC to expand system operation flexibility by providing external heat sink with forced air for heat rejection when a vehicle is stationary or in traffic.

d. It is another object of FFC to improve cold starting and operation by warming air in cold weather.

e. It is another object of FFC to reduce cold operation emissions by warming air during critical initial operation.

f. It is another object of FFC to increase system efficiencies with reduced device length, improved device shape, and superior core materials.

g. It is another object of FFC to reduce system losses with improved case insulation with advanced materials h. It is another object of FFC to expand engine enhancement options to designers and modifiers with temperature supplementation for critical loads.

i. It is another object of FFC to facilitate further applications with multiple sensors and system flexibility to be automated and controlled.

j. It is another object of FFC to be of such compact size that it can be fit into small spaces, for example in front of or next to radiator, and under the vehicle hood.

k. It is another object of FFC to be battery powered (from vehicle or by auxiliary source) thereby causing no parasitic drains and no power loss during critical operation.
l. It is another object of FFC is to be compatible, that is the invention can be used in conjunction with other devices. Thus FFC can be used along with or in place of air-to-air or air-to-water intercoolers.
m. It is another object of FFC to be stackable, multiple stages of FFC can be serialized to extend the temperature range.
n. It is another object of FFC to be array-able in order that multiple copies of FFC can be arranged in parallel with any number of elements (active devices).
o. It is another object of FFC to be embeddable such that it can be built right into devices such as existing intake or outlet pipes.

SUMMARY OF THE INVENTION

In accordance with the present invention, the Flowing Fluid Conditioner (FFC) discloses a system that can assist in the implementation of smaller engines with reduced fuel consumption, lowered emissions while maintaining performance of larger engines these more efficient versions will replace. FFC affords a simple, flexible, reliable intake flowing fluid chiller/warmer system that will raise or lower intake fluid temperature as required, or when on demand by the device and system. The present invention is specifically a flowing fluid conditioner system, which consists of an active thermoelectric device, a collection of sensors, a thermal exchanger/reservoir, fluid control valves, a by-pass pathway, and a controllable fluid pathway. An external controller can regulate relative amounts of electric current to the active cooling device and control the valves to divert the path of airflow through the multi-chamber (consisting of by-pass and controllable fluid chambers) intercooler. Thermoelectric devices specifically Peltier junctions or Thermotunneling diodes are known for their ability to heat or cool by selection of power polarity to these devices.

Under differing engine conditions such as under low engine load or high engine load, the flowing fluid conditioner system can respond to signals from an external controller in order to optimize engine operation efficiency and preserve battery charge. Typically, a vehicle with FFC starting in a cold environment would pre-warm exchanger/reservoir prior to start. When started (FFC will shut down during cold cranking to minimize starting load) FFC will continue to warm incoming air for initial performance and emissions reductions. In contrast (changed conditions) a vehicle with FFC in a warm environment will "charge" exchanger/reservoir cold before or after starting. This exchanger/reservoir state of cold will be kept cold in the insulated housing with a trickle current until a demand condition accesses exchanger/reservoir for temperature conditioning and additional available performance.

The FFC responds to signals from the controller to supply current to the thermoelectric cooler that cause it to heat or cool exchanger/reservoir. Command signals from controller also cause the FFC to directly adjust the valve or valves to increase airflow through the bypass chamber or divert airflow over the exchanger/reservoir chamber to the engine.

As a result of the temperature of engine aspiration being lowered on-demand, the engine wide-open throttle power is increased and because a smaller displacement engine is able to produce more power overall fuel efficiency can be increased. In the event that the external controller signal fails, the failure position of the FFC valve is in the normal aspiration position. The majority of performance requirements when driving on streets and highways are satisfied by short bursts of power on the order of less than thirty seconds. Even drag races between performance vehicles are typically staged for a quarter mile and completed in less than thirty seconds. The FFC invention is ideally suited to be adapted to hybrid and combination designs of superchargers and turbochargers, but also with normally aspirated engine configurations. The FFC invention can be used as an input to any system that can benefit from the conditioning of hot or cold fluids.

The air conditioned by the FFC invention can be further used as an input to any system that can benefit from cooling hot air to make it denser as in a combustion engine to increase power or to warm very cold air for improved starting. The FFC invention will also function as an on-demand in line intercooler. The present invention can work with existing air-to-air, water-to-water, or air-to-water intercoolers. The FFC invention has a small footprint, which can be built into housings, castings or adapters for very localized fluid temperature conditioning. The present invention can also be configured to condition the temperature of coolant in air-to-water or coolant intercoolers that are used during on-demand situations.

SUMMARY OF USES

Use of FFC provides means to facilitate reduction in fuel consumption while retaining engine power. This can be accomplished by reducing engine displacement and adding FFC resulting in lower fuel consumption with retained power. FFC provides means to respond to a controller, which monitors loads and temperatures and gives engine inlet temperature requirements necessary to achieve the best overall efficiency and therefore performance.

Use of FFC provides means to reduce emissions while retaining engine power. Reducing engine displacement and adding FFC results in lower emissions of pollutants with retained power. FFC provides means to respond to a controller, which monitors peak loads and temperatures and gives engine inlet temperature requirements necessary to reduce combustion temperature and raise efficiency of engine resulting in lower emissions.

Use of FFC provides means for smaller engines to produce expanded power during high load conditions. Charge air temperature is directly proportional to the efficiency of an engine, horsepower is a way of expressing an engine's efficiency. FFC provides heating or cooling to modulate incoming air temperatures allowing smaller engines to run "harder" during high demand times and retain their integrity and power.

Use of improved insulation in FFC improves thermal storage and enhances FFCs ability to provide immediate response to a demand for cooling and only needs a small peak current supply to release the stored BTUs and afford instantaneous response with lower charged air temperature. Use of improved insulation in FFC also prevents heat soak and the resulting temperature penalty and thereby permits the resulting design to be mounted in front of or in an engine compartment. The insulation will allow the FFC to operate with a 50 to 100 deg advantage over conventional intercoolers.

BRIEF DESCRIPTION OF THE DRAWINGS

The following discussion assumes the reader is familiar with internal combustion engines, heat flow, turbochargers, intercoolers, and electronic controllers.

Figure 1A:
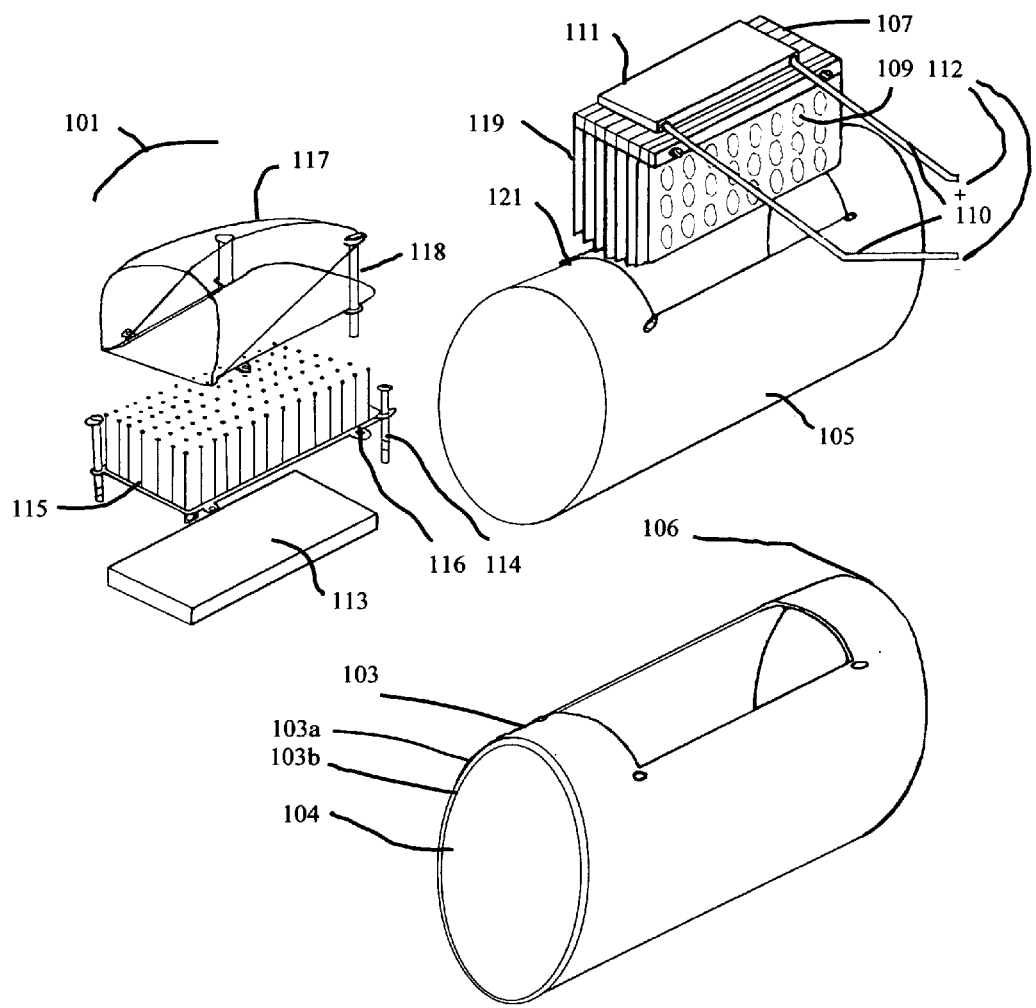
FIG. 1a is an exploded view of the preferred embodiment of the Flowing Fluid Conditioner invention.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

Reference Numerals In Drawings

| Number | Description |
|---|---|
| 101 | Flowing Fluid Conditioner |
| 103 | Insulating shell (double wall non-thermally conductive i.e. composites or plastics) |
| 104 | intake to conditioner 101 |
| 105 | Housing (thermally conductive i.e. copper) |
| 106 | Outlet from conditioner 101 |
| 107 | Exchanger plate (highly thermally conductive internal i.e. copper, silver) |
| 108 | N/A |
| 109 | Holes, turbulence inducing (multiple) |
| 110 | Power cable, 2 conductor, 10 ga. Copper wire |
| 111 | Pump (Thermal, Peltier Junction, http://www.tetech.com) |
| 112 | Power connections 12–28 v (+, −) |
| 113 | Exchanger (external dissipation highly conductive i.e. copper) |
| 114 | Screws (X4, stainless steel) |
| 115 | Radiator (external) MCX-4000 (http://www.cooltechnica.com) |
| 116 | Holes (mounting, threaded, X4) |
| 117 | Scoop (plasic, air direction) |
| 118 | Screws (X4, stainless steel) mounting scoop to radiator 115 |
| 119 | Plates (highly thermally conductive i.e. copper) |
| 120 | Epoxy (securing plate(s) 119) |
| 121 | Holes (mounting, threaded, X4) |
| 123 | Spacer (plates, conductive) |
| 124 | Actuator control/sense cable (RS 232 or 422) |
| 125 | Screws (stainless steel) |
| 127 | Nuts (threaded, stainless steel) |
| 128 | Surface (exchanger 107) |
| 129 | Washer (lock, stainless steel) |
| 131 | Exchanger assembly (air) MCX462 + T (http://www.cooltechnica.com) |
| 133 | N/A |
| 134 | N/A |
| 135 | Exchanger with fan |
| 136 | N/A |
| 137 | Fan Delta-WFB1212M (http://www.cooltechnica.com) |
| 138 | N/A |
| 139 | Gasket |
| 140 | Power (fan, 12 V +, −) |
| 141 | Shroud plastic (fan, offset) |
| 143 | Exchanger (water) MCW5002-PT (http://www.swiftnets.com) |
| 145 | External exchanger (water) |
| 147 | Hose Clearflex tubing ⅜ or ½ inch (http://www.swiftnets.com) |
| 149 | Pump (water) HydorL30-EU (http://www.swiftnets.com) |
| 151 | Radiator BIPro-CustomBarbs-BLK (http://www.swiftnets.com) |
| 153 | Fan JMC88 (http://www.swiftnets.com) |
| 154 | N/A |
| 155 | Reservoir Floppy-BayRez-UVBlue (http://www.cooltechnica.com) |
| 157 | On demand intake embodiment |
| 159 | View port |
| T1 | Thermistor (or thermocouple) measuring incoming (ambient) air temperature BC1485-ND, 470 K 3% (http://www.digikey.com) |
| T2 | Thermistor (or thermocouple) measuring incoming (internal) air temperature BC1485-ND, 470 K 3% (http://www.digikey.com) |
| T3 | Thermistor (or thermocouple) measuring chiller core temperature BC1485-ND, 470 K 3% (http://www.digikey.com) |
| T4 | Thermistor (or thermocouple) measuring chiller exiting air temperature BC1485-ND, 470 K 3% (http://www.digikey.com) |
| T5 | Thermistor (or thermocouple) measuring engine exhaust temperature BC1494-ND, 100 K 5% (http://www.digikey.com) |
| 161 | Chamber (steady state) |
| 163 | Chamber (containing plates 119) |

-continued

Reference Numerals In Drawings

| Number | Description |
|---|---|
| 165 | Chamber (flow to radiator 115) |
| 166 | Shaft (connecting valves, stainless steel) |
| 167 | Valve (normal butterfly, brass) |
| 168 | Power cable 2 pair, 10 ga. copper |
| 169 | Valve (burst butterfly, brass) |
| 170 | Control cable operation and position sensing, actuator 172, RS 232 or 422 |
| 171 | Arm (valve, butterfly operation) |
| 172 | Actuator for Arm 171, Type 56AA-12DC from http://www.chemline.com |
| 173 | Holes, Temperature sensor T2 and T3 |
| 175 | Chiller embodiment(water-to-water) |
| 177 | Valve a (divert chiller or intercooler) |
| 179 | Valve b (divert chiller or intercooler) |
| 181 | Shroud (existing) |
| 183 | Block (water) |
| 185 | Booster (existing turbo or supercharger) |
| 187 | N/A |
| 189 | Temperature sensor (radiator) |
| 190 | Reservoir Floppy-BayRez-UVBlue (http://www.cooltechnica.com) |
| 191 | Cut-out Relay (existing) |
| 193 | Intercooler (existing water to water) |
| 195 | Penetrations (probe positioning) |
| 197 | Honeycomb diffuser (internal radiator) |
| 199 | N/A |
| 201 | Overlap (left) |
| 203 | Overlap (right) |
| 205 | Overlap (left) |
| 206 | Flowing fluid conditioner overall system |
| 208 | Display cable |
| 207 | Flowing fluid conditioner display |
| 209 | CPU |
| 210 | Power cable |
| 211 | Memory |
| 213 | Real Time Clock |
| 215 | Cable to T1–T5 thermistors |
| 216 | Cable CPU209 to Controller 225 |
| 217 | Air filter |
| 219 | By pass channel |
| 221 | Y combiner |
| 223 | N/A |
| 225 | Controller 5C7-388 Switcher supply with PWM (http://www.OvenInd.com) |
| 227 | Throttle position sensor (TPS) (on vehicle) |
| 229 | TPS cable C1352-X-ND (http://www.digikey.com) |
| 231 | Throttle body (on vehicle) |
| 233 | Engine (on vehicle) |
| 235 | Exhaust manifold (on vehicle) |

DETAILED DESCRIPTION OF THE INVENTION

Reference will now be made to the drawings wherein like structures will be provided with like reference designations.

Hardware Overview of the Prefered Embodiment

Figure 1B:
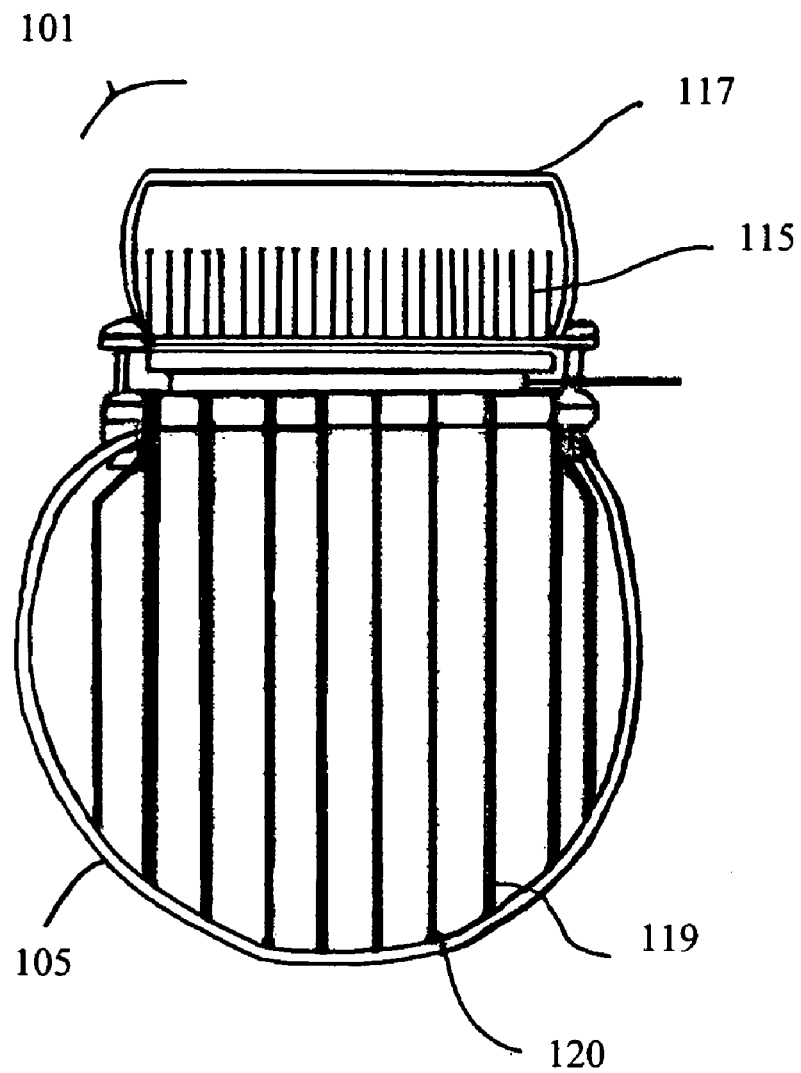
FIG. 1b is a front view of the preferred embodiment of the invention.

FIG. 1a is an exploded view of the preferred embodiment of the Flowing Fluid Conditioner for conditioning air for an internal combustion engine. The Flowing Fluid Conditioner 101 consists of an insulating shell 103 that surrounds a thermally conductive housing 105. Housing 105 contains the heat exchanger 107. Exchanger 107 is comprised of plates 119 that feature multiple turbulence inducing holes 109 for increased heat transfer efficiency. Exchanger 107 transfers thermal energy (hot or cold) from heat pump 111. Pump 111 in the preferred embodiment is peltier junction HP-199-1.4-0.8 (P) from TE Technologies (www.tetech.com ). Multiple pumps can be stacked for additional temperature differential. Identical polarities will assure pump 111 compatibility. Power is provided for supply of voltage from 112 over cable 110. Pump 111 has a complimentary heat exchanger 113 with radiator 115 to be installed over pump 111 for heat (or cold) removal. Radiator 115 is shown with air scoop 117 for cooling in applications where airflow is available, such as a moving engine. Exchanger 113, pump 111, and radiator 115 are held against exchanger 107 by threaded holes 121 in housing 105 by stainless screws 114. Scoop 117 is secured to radiator 115 at threaded holes 116 by stainless steel screws 118. FIG. 1b is a frontal view of an assembled version of Flowing Fluid Conditioner 101. This configuration is intended to maximize heat transfer with minimal flow resistance. Fluids traveling through housing 105 will be exposed to plates 119 for heat exchange. Plates 119 should be secured to housing 105 mechanically by use of slots for plates 119 and secured with epoxy 120 or such bonding techniques. Air (from similar or different sources) will be collected in scoop 117 for heat removal, or collection from exchanger 115.

Figure 2A:
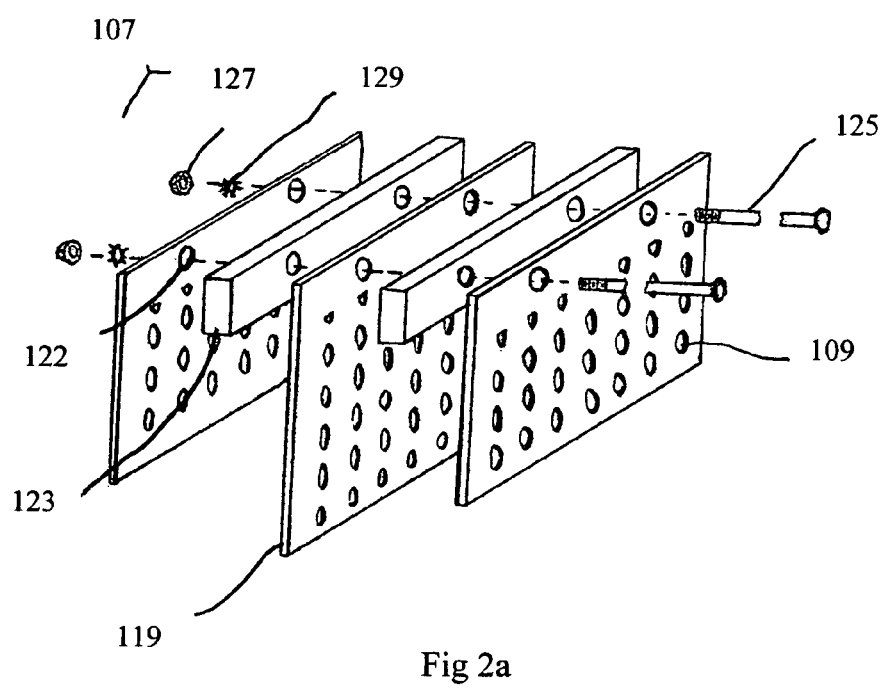
FIG. 2a is a detailed view of internal'exchanger plate portion of FFC invention.

FIG. 2a is an exploded view of exchanger 107 portion of the preferred embodiment of the invention. Exchanger 107 is a stack of parallel conductive plates 119 (three plates 119 are shown) and conductive spacer plates 123 with mounting holes 122 (2 each). Gold plating to resist corrosion of plates 119 may be desirable in harsh environments. Spacers 123 are positioned to separate plates 119. Spacers 123 (two spacers are shown) should be chosen to facilitate the maximum thermal exchange with the least flow restriction. Plates 119 and spacers 123 are bolted together through 2 aligned holes 122 (in each plate 119 and spacers 123) with a stainless steel bolt 125 (×2), stainless nut 127 (×2) and stainless lock washer 129 (×2) to form a stack, exchanger 107.

Figure 2B:
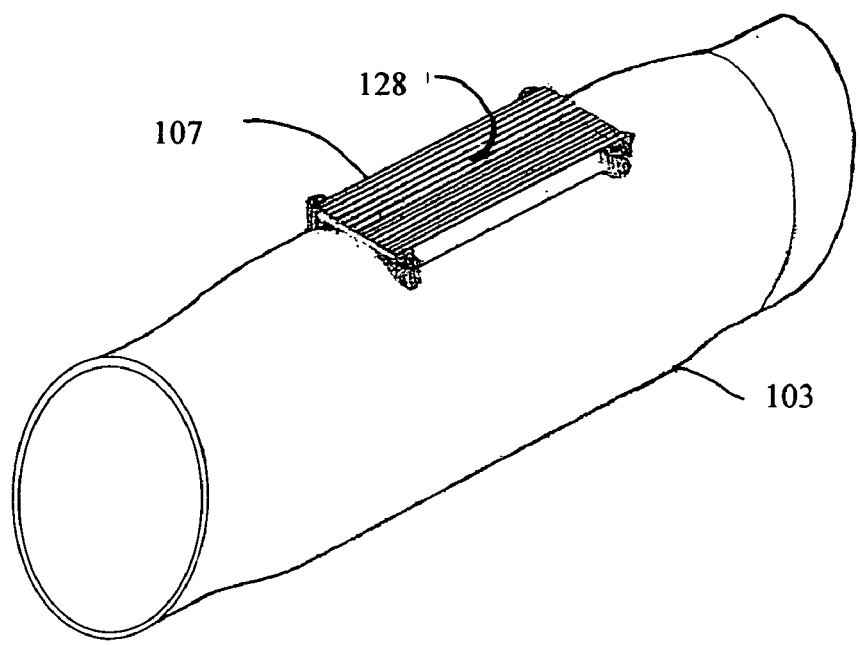
FIG. 2b is a view of FFC housing with thermal dissipater portion inside the invention.

FIG. 2b shows exchanger 107 protruding from housing 103. Surface 128 of exchanger 107 should be extremely flat and machining may be required.

Figure 3A:
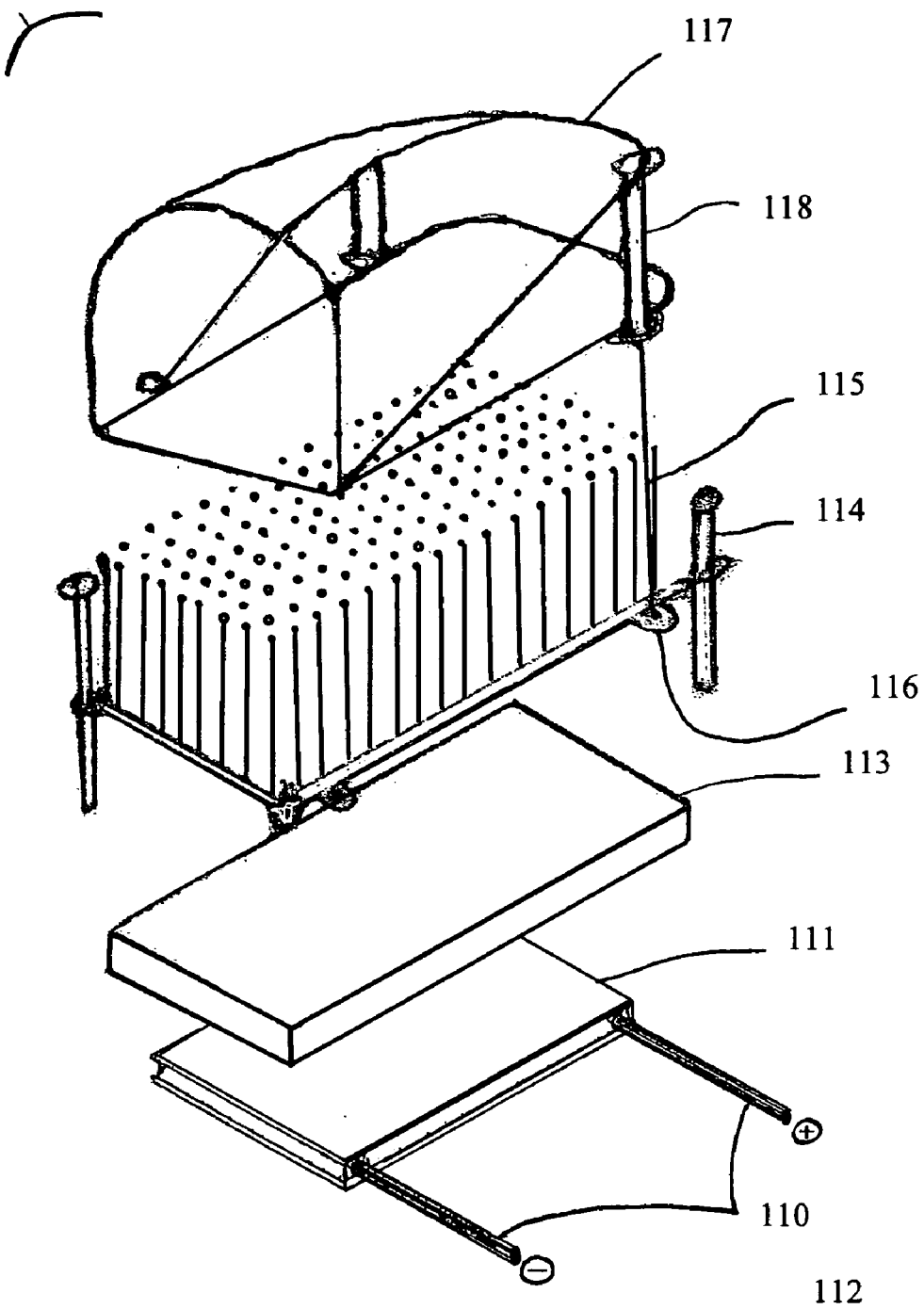
FIG. 3a is a detailed view of the external thermal exchanger portion of the FFC invention.

FIG. 3a is a detailed view of exchanger 131 portion of the invention. Exchanger 131 consists of pump 111, thermal plate 113, radiator 115, and scoop 117. Power is supplied over cable 110 from power source 112. Screws 118 (×4), threaded holes 116 (×4) secure scoop 117 to radiator 115. Screws 114 (×4) will secure radiator 115 to housing 105 (shown as holes 121 FIG. 1a).

Figure 3B:
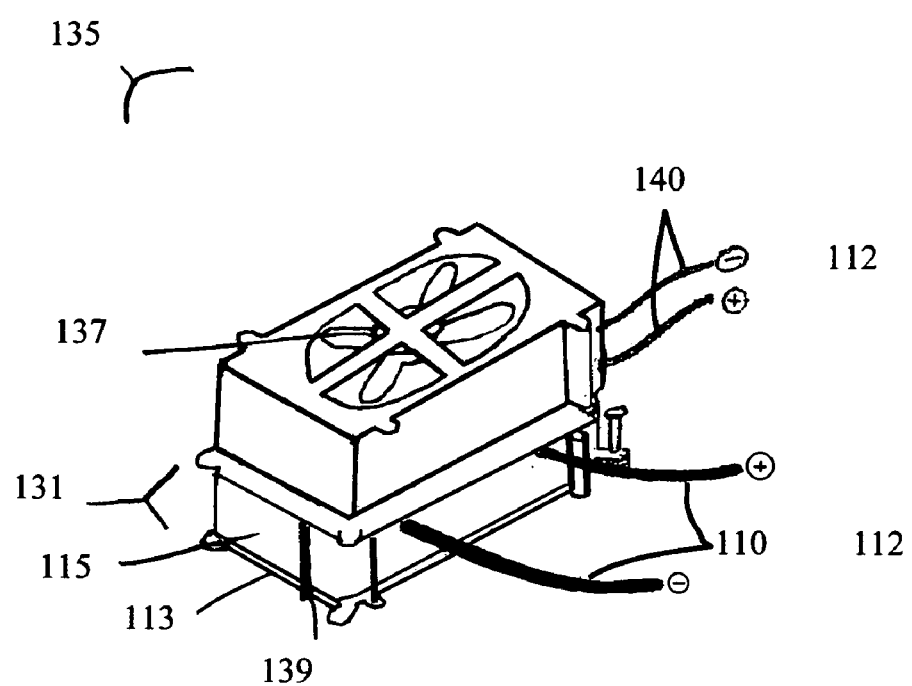
FIG. 3b is an assembled version of external thermal exchanger portion of the FFC invention with fan.

FIG. 3b displays a self-cooling version of said exchanger. Exchanger 135 is a modified version of exchanger 131 for applications where sufficient airflow is not available (such as a stationary vehicle). Exchanger 135 consists of thermal plate 113, and radiator 115. An assembled version of this portion is available from Swiftech (http://www.swift-nets.com), model MCX-400T. Power to exchanger 131 (pump 111 is inside as in FIG. 1a) is carried over cable 110 from power supply 112. Fan 137 such as EC1202M12CA from Evercool (http://ww.cooltechnica.com), and a surround gasket 139. Fan power is carried over cable 140 from power source 112 to energize fan 137.

Figure 3C:
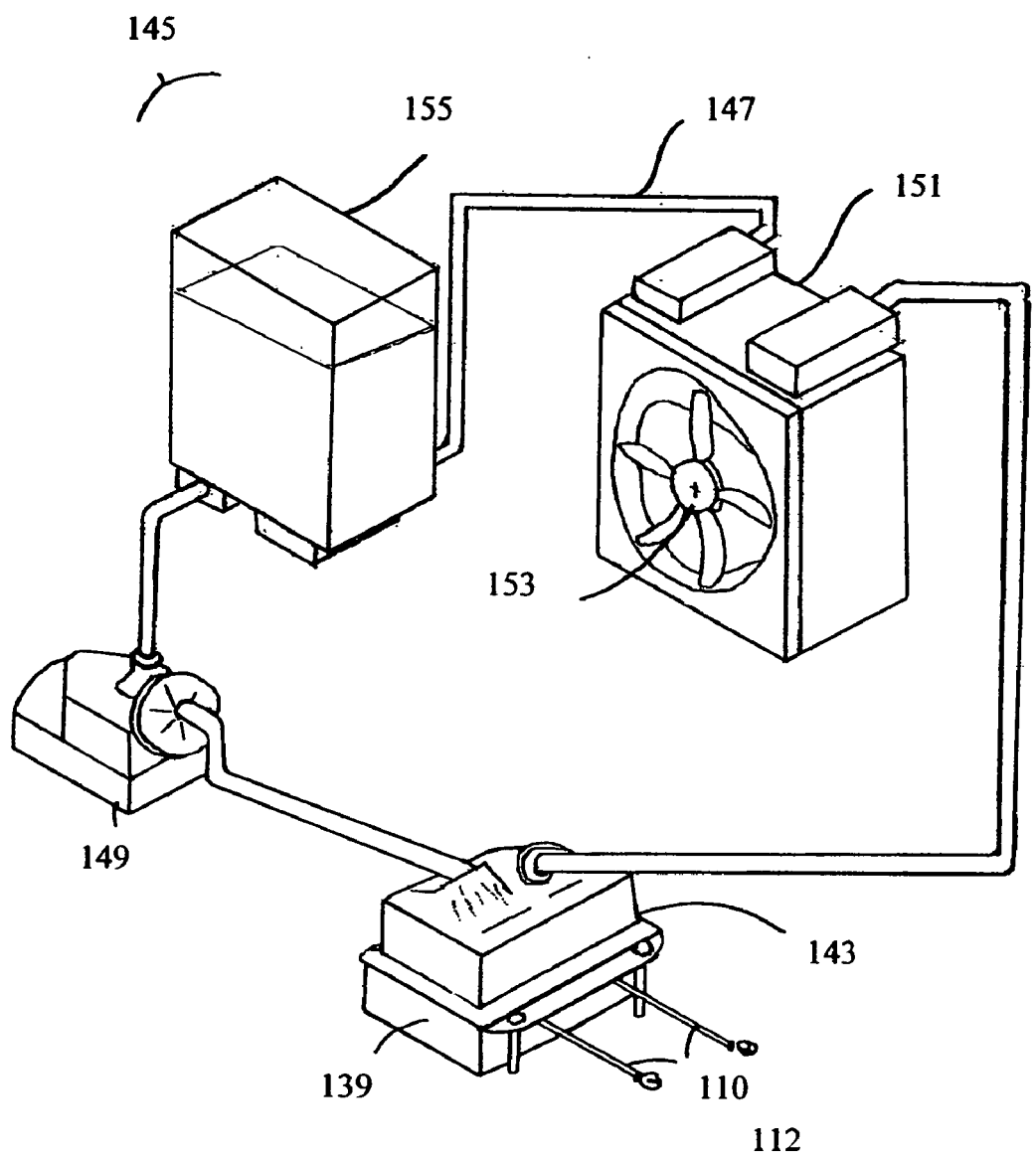
FIG. 3c is a detailed view of external thermal exchanger portion of the FFC invention with water heat removal.

FIG. 3c is yet another alternative embodiment where direct fans are not usable (i.e. hazardous environment). A water-cooled heat exchanger embodiment 145 is employed. Exchanger 145 is comprised of water block 143, such as MCW5000T from Swiftech, power is carried over cable 110 from power source 112, gasket 139, and radiator 151 is shown. Hoses 147 such as ClearFlex 60 from Cool Technica (http://ww.cooltechnica.com ) connect block 143 to output of liquid pump 149 such as FloJet from PPL Motor Homes (http://ww.pplmotorhomes.com/parts/rv-pumps-water-filters-fixtures-1.htm#Water%20Pumps%20-%20Flojet) and radiator 151 such as Black Ice Micro from CoolTechnica Radiator 151 has fan 153 such as EC1202M12CA from Evercool (http://www.evercool.com) for thermal exchange. Additional hose 147 connects radiator 151 to reservoir 155. Reservoir 155 filled with water or suitable coolant has additional hose 147 connecting to input of pump 149. This embodiment allows efficient cooling and remote heat exchange (radiator 151), especially useful for applications such as dynomometer testing and other non-mobile or restricted applications.

Figure 3D:
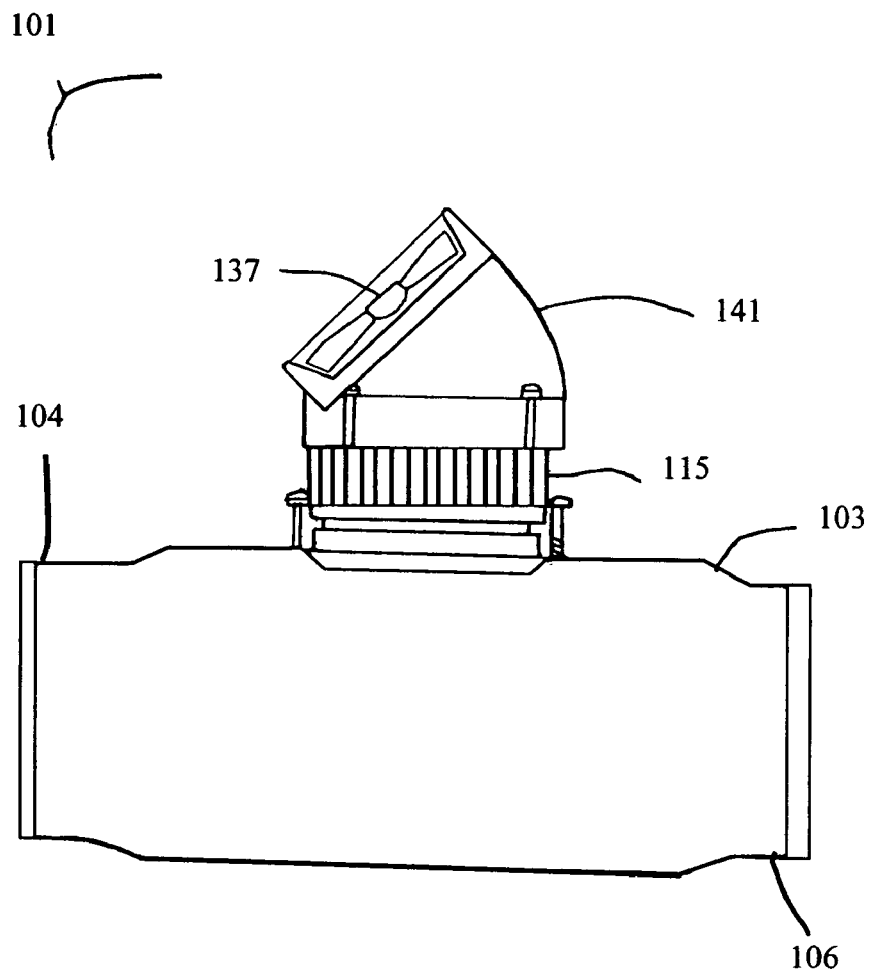
FIG. 3d is a side view of thermal exchanger portion of the FFC invention with induction air heat dissipation mounted on housing.

FIG. 3*d* displays a side view of FFC 101 with an offset shroud 141 (approximately 45 degrees of offset). Air is taken in through inlet 104 and exits through outlet 106. Shroud 141 with fan 137 will improve airflow over radiator 115 shown with housing 103, This embodiment with fan 137 and shroud 141 is intended for improved flow in stationary or similar applications.

Figure 4:
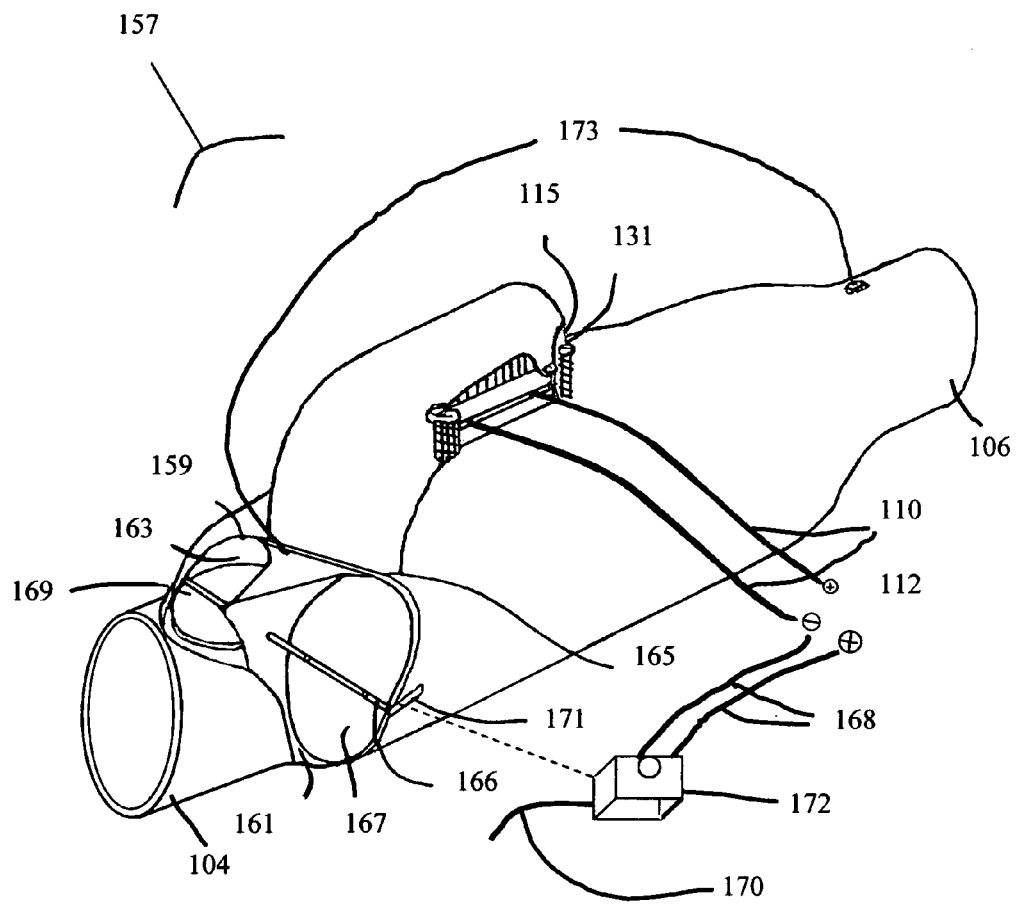
FIG. 4 shows an on demand embodiment version of FFC with a conditioning chamber and a by-pass chamber.

FIG. 4 displays an on demand version 157 of the invention. Air enters through inlet 104. A cut away or view port 159 allows viewing into version 157 to depict the internal configuration. Air entering through inlet 104 has three chamber openings. Chamber 161 is for normal airflow or steady state operation, essentially straight through. Chamber 163 is for short bursts of conditioned air and is isolated from airflow during normal operation. Chamber 165 is an integrated version of scoop 117. Chamber 165 collects incoming air and circulates this air over radiator 115 on exchanger 131. Air will exit through outlet 106 and flows into standard engine input for air or fluid flow. A shaft 166 connects butterfly valves normal valve 167 and conditioned valve 169 in an either/or configuration. Operation of shaft 166 is by arm 171. Arm 171 can be controlled manually, by a dedicated controller or by a system signal (such as Wide Open Throttle on a vehicle).

In typical operation, while blocked, by valve 169 being closed, heat pump (111 in FIG. 1*a*) inside 131 would "charge" exchanger in chamber 165 (as plates 119 in FIG. 1*b*) with power connections 112 over cable 110 while chamber 161 flows through to outlet 106 to feed engine. When extra power is needed for passing or similar requirements, operator will signal need with accelerator to floor. With pedal to floor, WOT signal is present (or manual operation) will actuate arm 171 close chamber 161 and open chamber 163. Fluid will now flow through chamber 163 with exposure to exchanger in chamber 163. Automated actuator 172 is connected to controller over computer cable 170. Actuator 172 is powered by supply 112 over power cable 168. Actuator 172 attaches over arm 171 to facilitate operation without operator intervention. Temperature conditioning will be accomplished. In the described application, colder air will present a colder and denser fluid to the temperature sensor hole 173. Temperature sensor hole 173 can accommodate a vehicle intake sensor that is connected to the vehicle computer and will then adjust the vehicle air-fuel mixture. The vehicle processor will be able to compensate when the intake air temperature is conditioned and increase fuel richness for a power burst. Typically a controller will charge conditioning chamber 163 during normal operation and when chamber 163 is accessed power to exchanger 131 will be suspended to minimize pear current loads on engine electrical system. If auxiliary power is incorporated this may not be necessary. Further power gains can be realized by a mapping of engine fuel and boost adjustments. Sizing of the heat pump, number and size of plates, and the chamber diameter is based on demands of the engine. Additional power can also be accomplished by use of Turbo and/or Super chargers. Alcohol or water-injection may also be desirable for some applications.

Figure 5:
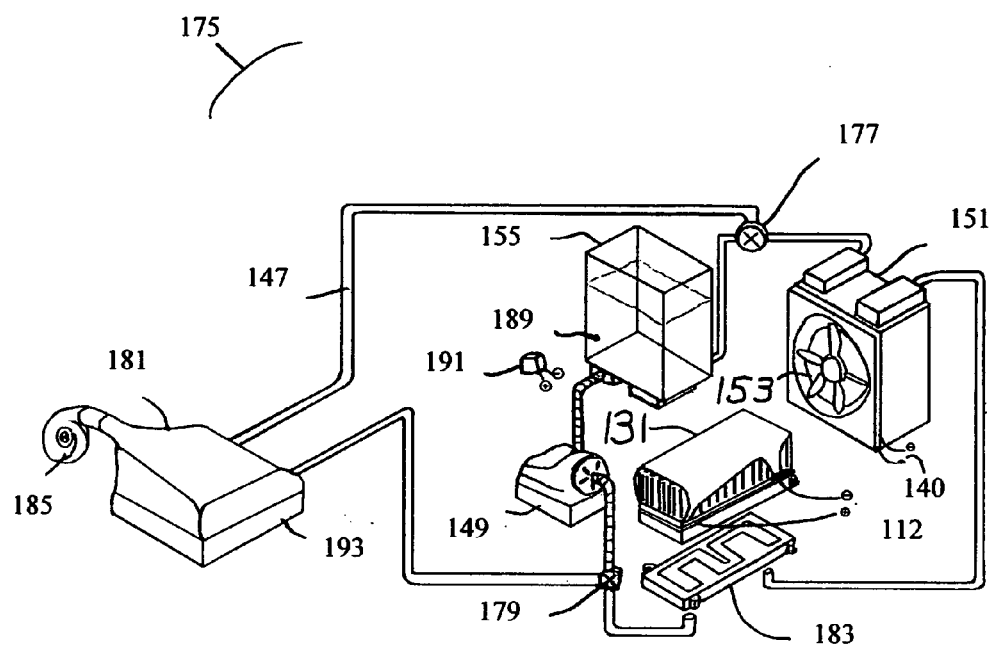
FIG. 5 shows an alternative embodiment version of FFC as an add-on, to an existing intercooler system.

FIG. 5 shows an alternative embodiment 175 incorporated into a charged intake system with water-to-water intercooler. Embodiment 175 is connected to an existing water-to-water intercooler system (such as on Ford's 2004 Lighting Pick Up) by diverting valves 177 and 179 to lines that normally provide heat removal with pump 149, fan 153, fan power 140, reservoir 155 (normally filled with water or appropriate liquid), and radiator 151. (Ford's 2004 Lightning Pick Up uses a different type of radiator but the function is the same). A recharge cycle for the liquid in reservoir 155 is provided when liquid is routed-through hoses 147 to water block 183 such as TC-4 from Cool Technica. Block 183 is cooled by heat exchanger 131. Block 183 liquid flow is routed to radiator 151 through additional hose 147. Radiator 151 flows to reservoir 155 by additional hose 147 and directed by valve 177. Power to exchanger 131 is by connections 112. Pump 149 during recharge will circulate fluid from reservoir 155 through valve 179 and hose 147 to block 183. Cooled fluids flow through hose 147 to valve 179 and back to reservoir 155. When recharged a temperature sensor 189 shuts off both pumps (149 and 111) through power relay 191. When extra power is required such as in passing or similar demand situations, the WOT signal will turn on pump 149 and open valves 177 and 179 thereby flowing cold liquid to water-to-water intercooler 193. Intercooler 193 with heated compressed air from booster 185 through shroud 181 will now be better able to reduce the temperature of the charged air passing into the engine. A recharge cycle can be reinitiated following system demand. This type of application is expected to be useful for small and hybrid vehicles needing to climb hills and merge into traffic in addition to their performance applications.

Figure 6:
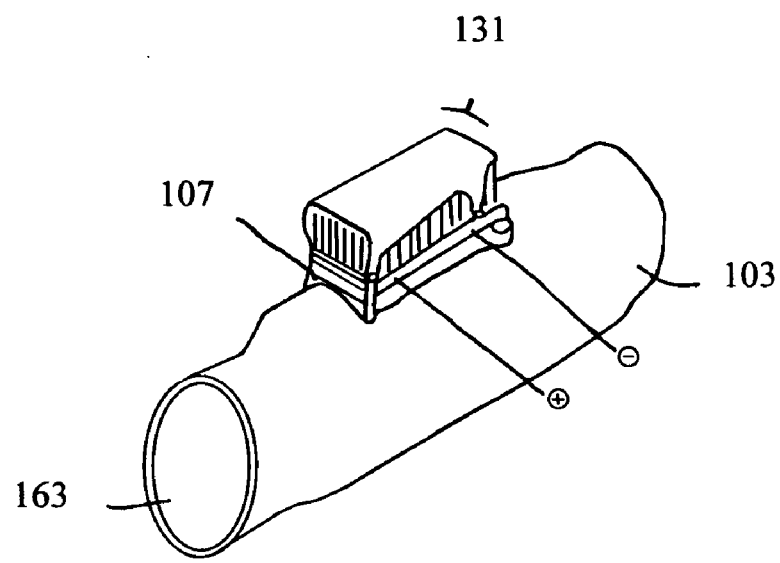
FIG. 6 shows a standard configuration of the preferred embodiment of FFC invention.

FIG. 6 shows housing 103 with exchanger assembly 131 mounted to exchanger plate 107, shown to operate as chamber 163. Internal exchanger embodiment variations are displayed in FIG. 6*a* through FIG. 6*c*. In these embodiments conditioning is accomplished by addition of exchanger 131 shown in this figure.

Figures 6A, 6B, 6C:
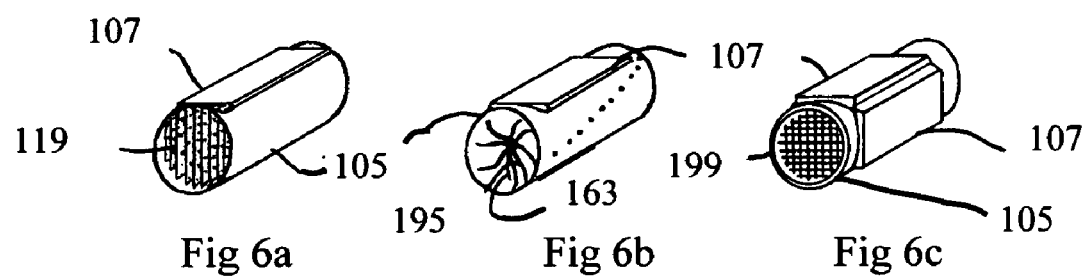
FIG. 6a shows the internals of the preferred embodiment of FFC invention.
FIG. 6b shows an alternative embodiment of FFC invention featuring a radiator with spiraling exchange probes.
FIG. 6c shows an alternative embodiment of FFC invention with multiple thermal exchangers capability.

FIG. 6*a* shows the basic exchanger 107 mounting surface with plates 119 inside housing 105.

FIG. 6*b* shows a version of housing 105 of with thermally conductive probes 195. Position for mounting-of exchanger 107 is shown. Probes should be of sufficient length to meet at the center of housing 105 or to complete a tnansition from side to side. Probes 195 are thermally secured and penetrating into the fluid flow chamber 163. Probes 195 are configured in a spiral arrangement to maximize heat transfer and minimize flow resistance to fluids flowing through housing 105.

FIG. 6*c* shows a version of housing 105 containing two exchanger 107 mounting positions at a normal angle. These plates 119 (as shown in FIG. 6*a*) at normal orientation form a honeycomb type diffuser 199. This configuration looks much like a catalytic converter. Diffuser 199 is configured to maximize heat transfer and minimize flow resistance to fluids flowing through housing 105. Depending on volume requirements and recharge needs, multiple applications of exchanger (s) 131 can be implemented.

Figure 6D:
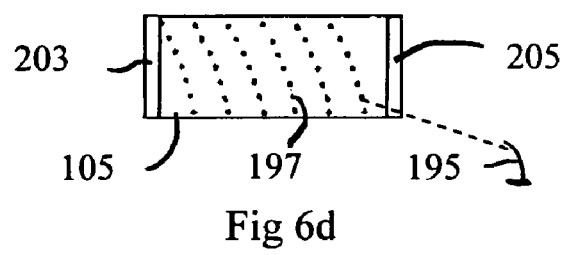
FIG. 6d shows a flattened sheet for patterns for construction of alternative embodiment as in FIG. 6b.

FIG. 6*d* shows a flattened sheet for housing 105 with a pattern for penetrations 197 (multiple for placement of probes 195. Penetrations 197 can be made and probes 195 inserted. Sheet for housing 105 is rolled into a form such as in FIG. 6*b*. Resulting housing 105 is then wave soldered to attach overlaps (left overlap 203 and right overlap 205) and to thermally and physically secure probes 195 to housing 105.

Figure 7:
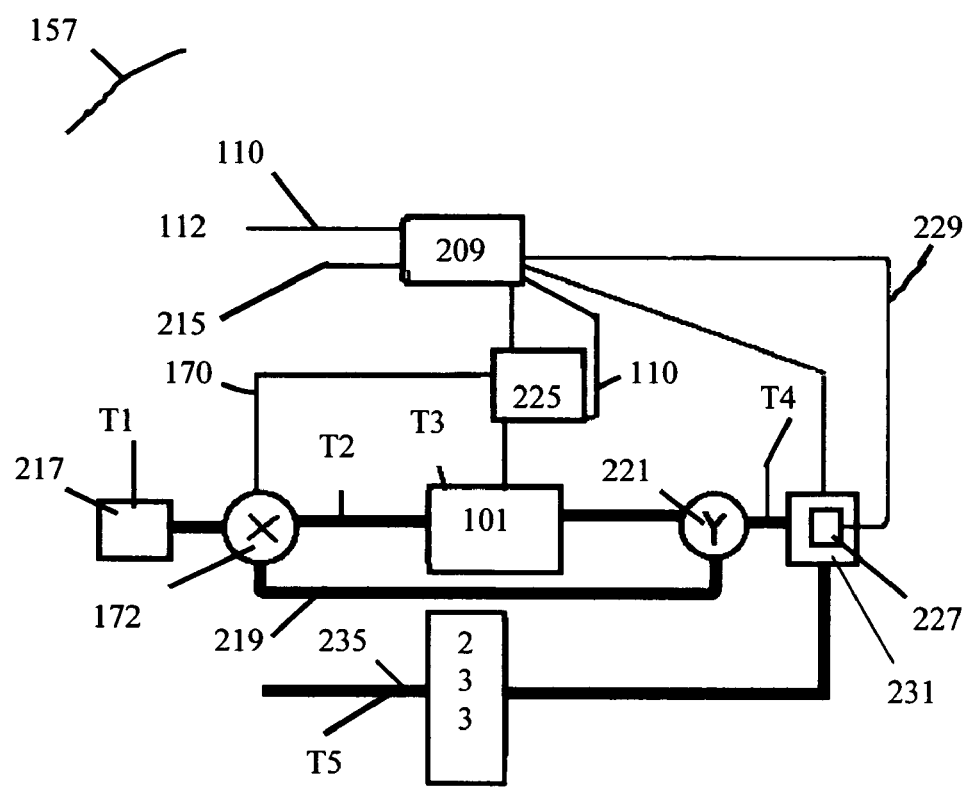
FIG. 7 shows a block diagram of FFC system functions.

FIG. 7 shows a block diagram of my invention 157. Power is supplied to CPU 209 and controller 225 by cable 110 from supply 112. Thermistors (or thermocouples) T1, T2, T3, T4 and T5 for sensing working temperatures of this embodiment are connected over cable 215. Air cleaner 217 filters incoming air for protection of system components and engine parts. Incoming air temperature is monitored at T1. Actuator 172 selects direction of incoming air flows by controller 225 with signals from CPU 209. Temperature of air coming into conditioner 101 is monitored at T2. Incoming air to be chilled (or warmed) is directed through conditioner 101 and further directed through combiner 221 into throttle body 231. Temperature of conditioner 101 core is monitored at T3. Normal airflow is directed by actuator 172 through by pass 219 to combiner 221 into throttle body 231. Actuator 172 signaling from controller 225/CPU 209, control and monitoring is accomplished over cable 170. Temperature of throttle body incoming air is monitored at T4. Controller 225 provides supervision of current for conditioner 101. Controller 225 receives power from supply 112 over cable 110 or auxiliary batteries, ultra-caps or fuel cells. Sensor 227 provides throttle position sensing to CPU 209 over cable 229. Sensor 227 exists on most vehicles and a common insulated connector/splitter will facilitate sharing of TPS signal without compromising signal integrity. Airflow proceeds as before with engine 233 receiving conditioned air from throttle body 231. Exhaust 235 temperature is monitored by T5.

Figure 8:
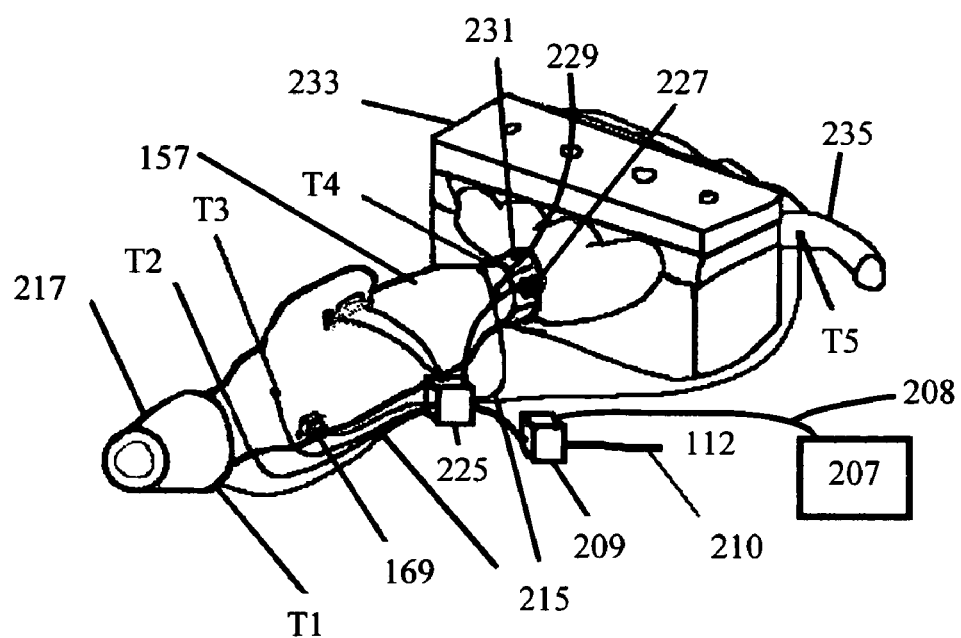
FIG. 8 shows a representation of FFC attached to an engine.

FIG. 8 depicts an on demand embodiment 157 of the invention connected to an engine 233. Air is taken in through air cleaner 217. T1 monitors temperature coming into air cleaner 217. T2 monitors fluid temperature entering conditioner 157. T3 monitors temperature inside conditioner 157. Actuator 172 is shown connected to controller 225 over actuator control/sense cable 124. Controller 225 is powered by extension of cable 110 from power source 112. CPU 209 is also powered by power source 112 over cable 110. Combiner 221 reunites bypass flow through by-pass 219 and conditioned flow from 101 (see FIG. 7) into existing throttle body 231. T4 monitors temperature-exiting conditioner 157. Throttle position is monitored existing throttle position sensor 227. Sensor 227 is connected to CPU 209 over cable 229. T5 monitors temperature of exhaust header 235. Controllers will combine the 5 temperatures (T1 through T5) and TPS values and infer engine load efficiency and requirements for conditioning of incoming air. FFC can also be combined with existing vehicle CPU's to cooperate interactively (affecting spark, fuel and other engine strategic mapping) for an improved solution. CPU 209 interfaces to controller 225 and measures and controls system operation. CPU 209 can additionally interface to vehicle standards such as OBD-2 and CAN for integration or supplementation.

SUMMARY OF ADVANTAGES OF THE INVENTION

From the description above, a number of advantages of the FFC become evident: FFC provides a system that can assist in the implementation of smaller engines with reduced fuel consumption, lowered emissions but maintaining performance of larger engines these more efficient versions will replace.

Use of thermoelectric heater/cooler permits greatly reduces the dependence on moving parts leading to high reliability.

Use of thermoelectric heater/cooler give higher temperature differential over passive temperature conditioning allowing small size of components parts allowing the fit of FFC into small spaces. Interface of intercooler controller to engine load permits virtual and actual on demand selectivity of cooling for emergencies or as required.

Use of thermoelectric heater/cooler permits powering of invention by any battery or similar electrically equipped system.

Powering of the invention by electricity permits reliance on auxiliary power sources and does not decrease overall efficiency with parasitic drains on primary power systems.

Alternative embodiments show the invention design is such that it is compatible alongside other devices such as air-to-air intercoolers or auto air conditioners.

Multiple stages of the invention can be stacked to increase temperature range for effective heating/cooling.

Alternative embodiments build the invention into existing devices such as existing inlets or outlets connectors.

Alternative embodiments build the invention into water-to-water systems by chilling water rather than air.

Multiple instances of the invention can be incorporated in a given system because of operation independent of parasitic powering sources.

In addition FFC compliments other technologies such as auto air conditioners or any flowing fluid system for additional benefits.

Installation and Operation

Pre-Installation FIGS. 1–4

For installation preparation, operator will assemble heat pump, internal exchanger, and external exchanger (radiator). All interfaces to Thermal Electric Coolers (TEC) require tight thermal interfaces. All assemblies should meet manufacturer's torque requirements (available from web site listed with drawings). Insert internal exchanger into housing, tighten securely, insulate. Mount TEC onto internal exchanger. Mount radiator, sandwiching TEC between internal exchanger and radiator. Using appropriate size reinforced silicone tubing and adapter, insert assembled housing into airflow inlet or between turbo, supercharger, intercooler, and throttle body inlet. When FFC is configured as an inlet, assure use of an efficient and capable air filter. Connect sufficient power supply using desired technique and source (battery, fuel cell, etc.).

Installation FIG. 8

To install an FFC installer will

1. Remove existing engine air intake at throttle body 231.
2. Connect output of combiner 221 to throttle body 231 with appropriate size reinforced silicon hose and clamps.
3. Connect cable 215 from CPU 209 to ends to T, T2, T3, T4, and T5
4. Attach air cleaner 217 to inlet of conditioner 157.
5. Connect throttle position sensor 227 to cable 229 with appropriate splitter (maintaining signal to existing engine controller.
6. Connect power cable 210 to source 112 or auxiliary power.

Operation

FFC operation is available when system is charged and a WOT signal is present from the throttle position sensor such as with on-demand uses. Additional capabilities and functionality can be accomplished with further processor logic and controls. Further benefits will also be realized with the addition of boosting incoming air pressure coming into conditioner 157.

A frontal Air-to-Air configuration allows FFC to be placed inline with the air intake by replacing the stock intake system and remounting the intake temperature sensor. As an example in a normally aspirated internal combustion engine driving on a hot summer day with 100 deg. F. taken into the induction; every 10-degree intake temperature drop will yield up to a 10% efficiency increase. With a boosted (such as a supercharger or turbocharger) engine the amount of boost is directly proportional to the temperature increase of the charged intake air. FFC will reduce the charged intake air, increasing efficiency and horsepower. Further gains can be exploited with engine re-mapping (spark and fuel curve adjustments), and addition of alcohol or water injection into conditioned intake will allow further performance improvements.

CONCLUSIONS, RAMIFICATIONS, AND SCOPE

Accordingly, the reader will see that FFC capabilities of this invention can be used to improve the performance, efficiency and life span of systems using this technology. Specifically, FFC provides a system that can assist in the implementation of smaller engines with reduced fuel consumption, lowered emissions but maintaining performance of larger engines these more efficient versions will replace. In addition, with few moving parts FFC is very reliable. FFC's minimal size allows uses in many applications. Furthermore, the attributes mentioned above will allow FFC to complement existing systems and devices. Additionally, operational flexibility will allow "on-demand" use, pre-charging FFC will allow more power to be available during peak demand periods.

Further, FFC housings can be built into existing orifices and fluid housings (such as air manifolds or boosting devices). Multiple FFC can be inserted into systems i.e. intake, between turbo and intercooler, between intercooler and inlet. Multiple devices can be in serial, parallel, or stacked (as a sandwich) arrangements for desired results.

Other applications include:
a. Pre-chiller (or warmer) for air conditioning
b. Fluid chiller/warmer for fuel, transmission, steering, or differential systems.
c. Emergency fluid conditioner.

Advantages to fluid flow conditioning are dependant on specific applications. Internal combustion engines only require temperature reduction during peak power applications. An FFC on demand facilitates the temperature control while minimized battery drain. The capacity for chilling compressed fluids is stored in the internal heat exchanger (plates, probes or diffuser) and energized from battery or auxiliary power. This allows the energy stored in the exchanger and battery during normal or braking conditions to be stored up and used during peak demand situations e.g. passing, freeway merging, and hill climbing.

Multiple implementations or stages of FFC can be configured to maximize power for specific applications. Hybrid vehicles with very small engines and electric motors are ideal for FFC applications. Electric superchargers will work particularly well (due to their similar "on demand" operation and battery power) and be more effective (higher horsepower and torque with FFC's incoming air temperature reductions).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A controllable intercooler system, the system comprising:
    an engine airflow diverter means for selecting a pathway for engine aspiration;
        means for measuring the temperature of an insulated thermally conductive core;
        means for regulating the amount of current driving a thermoelectric heater; and
        a control means which responds to engine load signal commands by selecting said pathway.

2. The system according to claim 1, wherein the thermoelectric heater has an associated heat exchanger core and is contained within a thermally insulated shell.

3. The system according to claim 1, wherein the thermally insulated shell enclosure uses multiple insulating layers of composites improving thermal isolation.

4. The system according to claim 1, wherein the engine airflow diverter selects between multiple air pathways, which are contained within a single housing.

5. The system according to claim 1, wherein said control device includes means to store computer programs and follow specific algorithms in accordance with stored programs and internal and external sensors.

6. The system according to claim 1, where improved insulation around intercooler core enables improved thermal storage preventing heat or cold losses from the thermally insulated shell thereby providing a reservoir of BTUs.

7. The system according to claim 1, where improved insulation around the core prevents heat soak and resulting temperature increases in the air provided by the intercooler.

8. The system according to claim 1, where separate intakes allow bypassing intercooler core to aid in thermal storage.

9. The system according to claim 1, where the system selects (using diverter butterfly valves) between straight input to engine or intercooler exposure thereby providing the ability to cool (or warm) incoming air by accessing reservoir of BTUs.

10. The system according to claim 1, where the system interfaces with a CPU for reduced emissions.

11. The system according to claim 1, where the system interfaces with the CPU for an improved performance.

12. The system according to claim 1, where the system interfaces with the CPU for an improved drivability.

13. The system according to claim 1, which has means to respond to command signals based on a plurality of sensor data including engine load or air temperatures and then controlling the heating or cooling of the thermoelectric element and the incoming air diverter selection of the air pathway.

14. An apparatus for controlling temperature conditioning of an internal combustion engine intake air, comprising:
   means for exchanging heat through a conductive core;
   means for selecting from a plurality of pathways for the internal combustion engine intake air;
   means to respond to input signal commands by selecting said pathway;
   means for reducing thermal transfer by containment of the conductive core within a double walled insulating shell;
   means for measuring the temperature of the conductive core; and
   means for conditioning which heats or cools the conductive core in response to a changing current or voltage signal.

15. The apparatus for temperature conditioning of an internal combustion engine intake air of claim 14, wherein the apparatus is an intercooler for an internal combustion engine.

16. The apparatus for temperature conditioning of an internal combustion engine intake air according to claim 14, wherein a CPU interface is an engine load determining means for sensing throttle setting or engine load and determining optimum air inlet temperature.

17. The a apparatus for temperature conditioning of an internal combustion engine intake air according to claim 14, wherein the means for selecting pathways is an engine airflow diverter for engine intake air for aspiration.

18. The apparatus for temperature conditioning of an internal combustion engine intake air according to claim 14, wherein the means for temperature-conditioning is a thermoelectric cooler or thermotunneling device.

19. The apparatus for temperature conditioning of an internal combustion engine intake air according to claim 14, wherein the means for temperature-conditioning has a radiator with forced air induction.

* * * * *